H. BOLDE.
TRIFOCAL LENS.
APPLICATION FILED NOV. 15, 1912.

1,082,491.

Patented Dec. 30, 1913.

Witnesses:

Inventor
Henry Bolde

UNITED STATES PATENT OFFICE.

HENRY BOLDE, OF NEW YORK, N. Y., ASSIGNOR TO THE MEYROWITZ MANUFACTURING CO., A CORPORATION OF NEW JERSEY.

TRIFOCAL LENS.

1,082,491.         Specification of Letters Patent.     Patented Dec. 30, 1913.

Application filed November 15, 1912. Serial No. 731,492.

*To all whom it may concern:*

Be it known that I, HENRY BOLDE, a citizen of the United States, residing at the city of New York, in the borough of Brooklyn and State of New York, have invented certain new and useful Improvements in Trifocal Lenses, of which the following is a full, clear, and exact description.

This invention relates to tri-focal lenses for eyeglasses and spectacles and has special reference to that class of multifocal lenses in which a completed lens consists of a major lens provided with one or more cavities in which is or are seated a minor lens or lenses of glass material of different refractive index, the surface containing the minor lenses being of even curvature throughout.

The primary object of the invention is to provide a construction of tri-focal lens in the grinding of whose surfaces the relative areas of the fields of vision of the two minor lenses will be under control.

My understanding is that heretofore in the construction of trifocal lenses the two minor lenses have both been seated on, or applied to, one of the faces of the major lens, so that when such lenses are seated in cavities of the major lens in the process of making, and the entire face of such lens is then ground to an even curvature, the circumscribed exposed area of the minor lenses must necessarily be altered in unequal ratio due to the fact that the curvatures of the inner faces of the minor lenses are different and are ground away with unequal rapidity.

My invention therefore consists of a trifocal lens comprising a major lens and two minor lenses, the latter being respectively seated in or applied to the two faces of the major lens, whereby the grinding of the two composite faces of the lens can be accomplished independently of each other and the circumscribed area of the two minor fields of vision can thereby be independently controlled.

For a more complete understanding of my invention, reference will be made to the accompanying drawing, in which—

Figure 1:
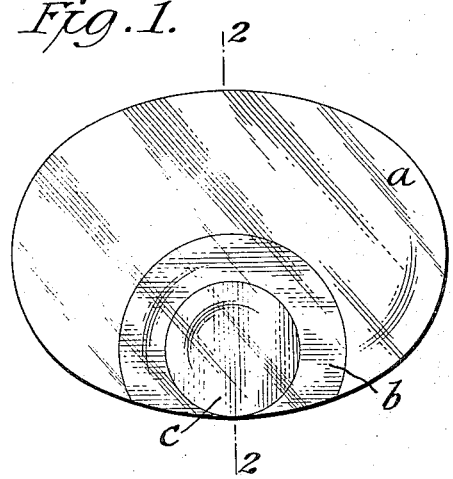
Figure 3:
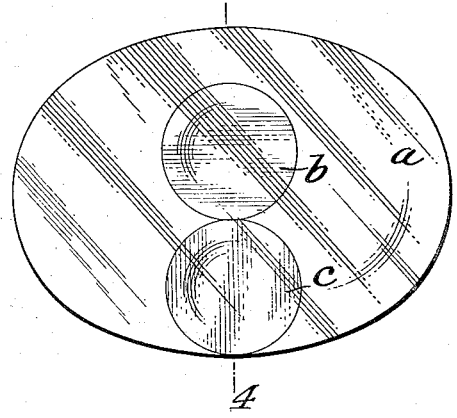
Figure 2:
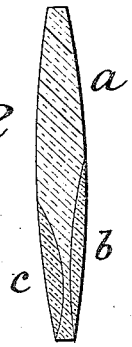
Figure 4:
Figure 5:
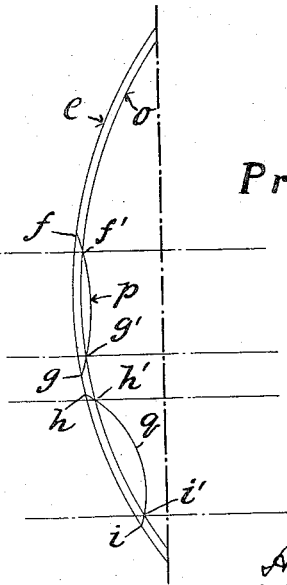

Figure 1 is a face view of one form of my improved lens, Fig. 2 is a section on line 2, 2 of Fig. 1, Fig. 3 is a face view of another form of lens including my invention, Fig. 4 is a section on line 4, 4 of Fig. 3, and Fig. 5 is a diagram illustrating the lack of control of the relative areas of the fields of vision in a composite lens when both of the minor lenses are applied to one face of the major lens.

In the various figures, $a$ indicates the major lens and $b$ and $c$ the respective minor lenses of a trifocal lens. The minor lenses are seated in cavities in the surfaces of the major lens, one being located in one face while the other is located in the other face of the major lens. The minor lenses are attached to the major lens preferably by fusing so that they become integral therewith, although this is not essential as they may be cemented in place by means of Canada balsam or other transparent material.

The lenses $b$ and $c$ are necessarily made of glass material having a different refractive index from the material of which lens $a$ is made, as otherwise no difference in focal power would be obtained when the exterior surface of the completed lens is ground to an even curvature throughout, as is the case with respect to my invention. For instance if lens $a$ is made of "crown" glass, the lenses $b$ and $c$ might be made of "flint" glass which has a different coefficient of refraction. As between the two lenses $b$ and $c$ however, which may be of material having the same co-efficient of refraction, the different focal powers is obtained by giving to their inner surfaces, which rest against the major lens, different curvatures. Thus in the finished lens we have three fields of vision each of different focal power from the other two. One of these fields is furnished by that portion of the major lens not overlayed by either of the minor lenses as for instance all of that portion outside of the edge of lens $b$ in Fig. 1 or that portion outside of the two circles $b$ and $c$ in Fig. 3. The second field in the structure of Fig. 1 is the annulus which lies between the boundaries of the two lenses $b$ and $c$, that portion located above the lens $c$ being most used, while in Fig. 3 the second field is represented by the area of lens $b$. The third field is represented in both constructions by the area of lens $c$. It is desirable to make the area of these different fields of vision conform to the requirements of use; thus for distance it should be possible to shift the line of vision to the right and left, hence the major lens $a$ which has the largest field should be used for this purpose. For reading or near vision where the eye does not wander, the smallest field may be used, hence $c$ is adapted for this purpose. For middle distance, where a person wishes to see where he is stepping for instance, the eye requires a little more latitude than in reading and the annulus of lens $b$ in Fig. 1 is adapted for this purpose. For middle distance however the field may be of practically the same size as the reading field, as shown in Fig. 3. The various fields of vision must in any case have a certain minimum area. So that with these things in view it is obviously desirable to devise a lens in the construction of which the areas of the various fields can be controlled.

In constructing tri-focal lenses of the kind herein referred to, it is customary to grind and polish the cavities or countersinks for the minor lenses in the rough blank of the major lens; then to secure rough blanks of the minor lenses, in said countersinks, the minor lens blanks having first been prepared with a polished surface to fit the countersinks which they are to occupy and finally the composite blank is ground to an even curvature throughout, the grinding tool cutting to a uniform depth into the major and minor lenses. Now, if the two minor lenses are located on the same side of the major lens, it is obvious that, since they are of different curvatures on their inner faces, the area of their outer surfaces will be unequally reduced by the grinding tool. For instance, if it be assumed that the grinding has reached the stage indicated by the line $e$ in Fig. 5, and the diameter of each of the minor fields $b'$ and $c'$ is then equal as shown by the distances between $f$ and $g$, and $h$ and $i$, and it is found that further grinding is necessary, say to the depth indicated by the line $e$, then it will be found that the diameter $f'$ and $g'$ is considerably less than the diameter $h'$—$i'$. This is due to the fact that the radius of the curvature $p$ is greater than that of $q$. Consequently no control can be exercised over the relative diameters or areas of the two minor fields of vision. If however, one of the minor lenses is located on each side of the major lens as shown in Figs. 1 to 4, it is obvious that the grinding can be continued on one side until the desired diameter of the one minor field is obtained, and then the grinding of the other side can be carried on until the desired diameter of the minor field thereon is obtained, without in the meantime disturbing the diameter of the field already determined on the first side.

Among the advantages which spring from the ability to control these diameters of the fields, is the fact that fewer lenses are spoiled in the grinding.

Having described my invention, I claim:—

1. A tri-focal lens comprising a major lens and two minor lenses seated respectively in the two faces thereof.

2. A tri-focal lens comprising a major lens and two minor lenses seated respectively in the two faces thereof, both faces of the completed lens being of uniform curvature throughout.

In witness whereof, I subscribe my signature, in the presence of two witnesses.

HENRY BOLDE.

Witnesses:
  AMELIA C. MOESCHEN,
  FREDERICK L. HIGGINS.